Feb. 12, 1963   J. ŠENK ETAL   3,077,111
CONTROL DEVICE WITH OUTPUT IN PULSE FORM
Filed June 27, 1958   2 Sheets-Sheet 1

INVENTORS
Jaromír Šenk
Jan Tolla
BY Richard End
ag't

United States Patent Office 3,077,111
Patented Feb. 12, 1963

3,077,111
CONTROL DEVICE WITH OUTPUT IN
PULSE FORM
Jaromír Šenk and Jan Folta, Modřany, Czechoslovakia, assignors to Zavody prumyslove automatisace, narodni podnik Praha, Prague, Czechoslovakia
Filed June 27, 1958, Ser. No. 745,219
8 Claims. (Cl. 73—362)

For certain comparatively simple manufacturing processes, for instance for a temperature control, two-step or three-step action electric control devices of various kinds are often used. As is well known, such control devices switch-in the supply of energy (for instance electric current) or a regulating member (e.g. an electric servomotor) at a certain state of the measured condition (e.g. at a certain temperature), and, after another state is produced, the control devices switch off the said energy or regulating member (in the case of two-step control devices), or (in the case of a three-step control device) they switch-in a reverse operation of the regulating member (e.g. an electric servo-motor).

The performance of such control systems is not very satisfactory, and for many applications they are completely unsuitable in view of their comparatively small accuracy. Therefore, many manufacturers endeavoured to improve the function of these simple and inexpensive control devices in various ways.

One way of improving the control action is the adoption of a regular interruption of the output of the control device to form trains of impulses in such a manner that the length of the individual impulses in relation to the impulse intervals is dependent on the control deviation, i.e. the deviation of the measured value—for instance temperature—from the desired value. With such a proportional action of the control device, the control performance is increased, as is well known.

It is an object of the invention to measure a controlled condition, such as a temperature deviation, and to provide improved means for producing a control action proportional to the deviation.

Other objects and advantages of the invention will become apparent and the invention will be fully understood from the following description and the accompanying drawing, in which.

Figures 1, 2:
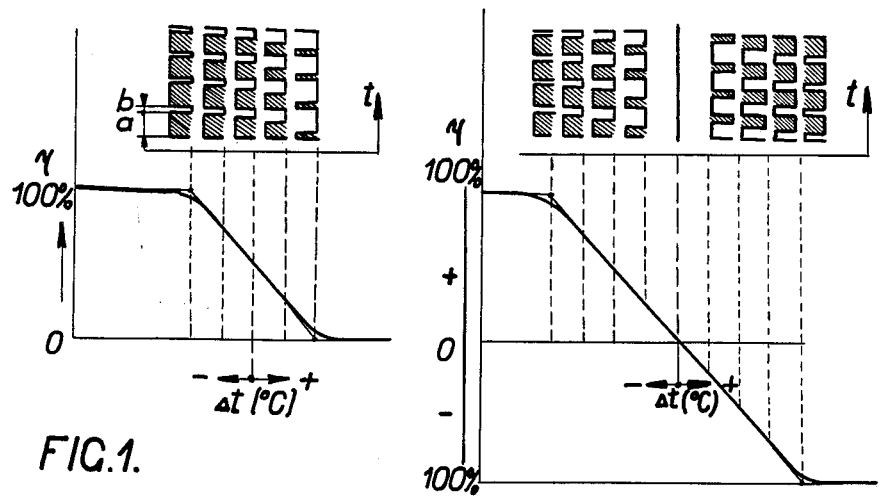
FIG. 1 is a diagram explanatory of the two-step or unidirectional control apparatus shown in FIG. 3.
FIG. 2 is a similar diagram relating to the operation of a three-step or bidirectional control apparatus shown in FIG. 4.

The static characteristic of a two-step control device with an output signal in the form of impulses dependent on the magnitude of the control signal is shown in FIG. 1 of the accompanying drawings. The duration of an impulse is indicated by the letter $a$, the interval between two impulses is designated by the letter $b$. Similarly in FIG. 2, the static characteristic of a three-step control device with impulse output is shown. It appears from both characteristics that the action of the control device, with its output converted to form impulses, is proportional (with a certain proportional range) although the control device as such is of the two-step or three-step kind. The curves in FIGS. 1 and 2 are plotted with the temperature deviation $\Delta t$ as the abscissa and $n$ as the ordinate, where $n$ equals the average value of the output pulses produced by the circuits of FIGS. 3 and 4 for different values of $\Delta t$.

The present invention, which fulfills the functional conditions according to FIGURE 1 or according to FIG. 2 respectively, is based on the utilization of certain characteristics of a magnetic amplifier which, in combination with an impulse circuit render the desired effect.

Figure 3:
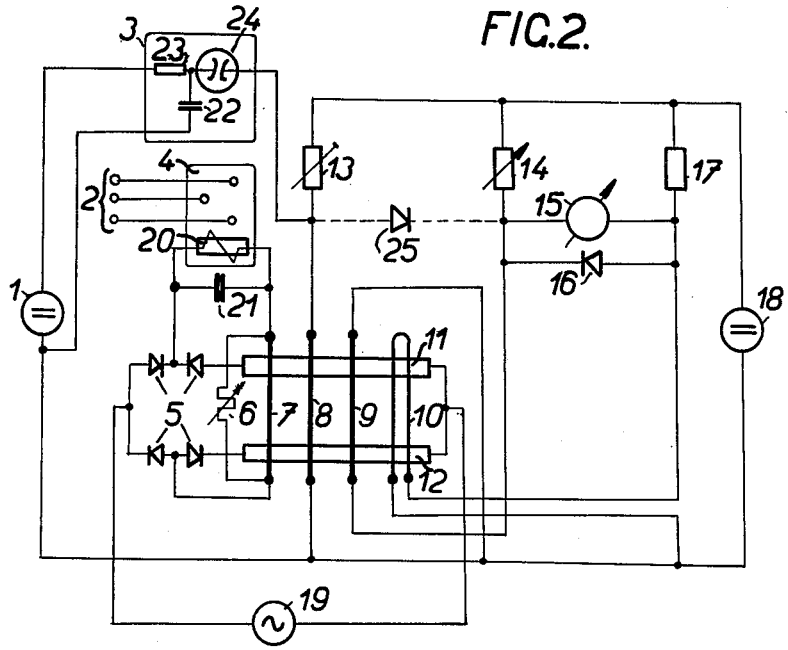
FIG. 3 is a circuit diagram of one embodiment of the invention.

The circuit arrangement of a two-step control device with impulse action according to the invention, for instance a temperature control device with a resistance detector and a measuring circuit, is shown in FIG. 3. The alternating voltage source 19 supplies the working circuit of the magnetic amplifier which circuit includes the working windings 11 and 12, rectifying members 5, and further a positive feed-back winding 7 (if desired shunted by a resistor 6) and a winding 20 (with a parallel connected capacitor 21) of the output relay 4. Capacitor 21 acts as a bypass for the A.C. component of the rectified current pulses flowing to relay winding 20 and thus prevents possible chattering of relay 4. Capacitor 21 also compensates the influence of the inductance of relay winding 20 on the magnetic amplifier. Stabilised direct-current voltage from the source 18 is supplied to: a circuit for the adjustment of the desired temperature value, including an adjustable resistor 13 and a control winding 8; a circuit for measuring the controlled temperature, comprising a temperature measuring resistance device 14 and a control winding 9; and, finally, a circuit for indicating the measured temperature, comprising a resistor 17, a bifilar winding 10, a measuring device 15, and rectifying member 16. The source 1 of direct-current voltage supplies the control winding 8 through an impulsing circuit 3, consisting of a capacitor 22, a resistor 23 and glow discharge valve 24. The impulsing circuit 3 could be replaced for instance by a periodically actuated mechanical switch or by any other known impulsing device. The output contacts of the relay 4 are connected to a source of heating current and a heating device the temperature of which is to be regulated.

The arrangement according to the invention operates as follows: The magnetic amplifier is so adjusted (by means of the shunt 6 to the feed-back winding 7) that it switches from an on to an off condition similarly to a multivibrator. The amplifier has a positive feed-back winding 7 which conducts load current rectified in 5. Because of this positive feed-back and by means of a resistance 6 arranged in parallel, the magnetic amplifier is so adjusted that it does not retain the properties of a proportional amplifier, but is in unstable equilibrium, that is, the current in the windings 11, 12 as well as in winding 20 of the relay 4 can assume only two stable values when the controlling magnetomotive force varies, namely maximum current and minimum current. The amplifier operates as a flip-flop circuit. The rate of change of the working current of the amplifier is dependent on the magnitude of the signal-control ampere-turns. The greater the number of ampere-turns, the greater is the rate of change. The control circuits of windings 8 and 9 of the magnetic amplifier are then so adjusted that its control ampere-turns are proportional to the deviation of the controlled condition from the adjusted value. If then electric impulses from the source 1, which have a suitable magnitude and sense, and are periodically repeated for instance by the impulsing circuit 3, to any one of the input windings (for instance to the winding 8 or to a separate winding), then the control device functions as has been described hereinbefore with reference to FIG. 1; that is to say, the time of connection of the relay within the individual impulse periods is dependent on the deviation of the temperature from the desired value. The winding 8 in the circuit for the adjustment of the desired temperature value and the winding 9 in the circuit for measuring the controlled temperature are connected in an opposite sense so that the difference of the ampere-turns which they produce influences the magnetic amplifier. The device 15 which is connected between the temperature measuring resistance device 14 and a suitable selected resistor 17, indicates the measured temperature. A rectifying member 16 is connected in parallel to the device 15, which member prevents the device from being overloaded in the case that the temperature is lower than the measuring range, and also prevents a connection of the output relay 4 when the circuit of the temperature measuring resistance device 14 or its supply conductor is interrupted. Instead of using the rectifying member 16 for the prevention of the connection of the output relay when the resistor (detector) 14 or its connecting conductor is interrupted, a rectifying member 25 may be used which is connected between the resistor 13 and the resistor 14 (which is indicated by dotted lines in FIG. 3). The bifilar winding 10, which has no influence on the control of the magnetic amplifier, compensates the influence of variations in temperature on the resistance of winding 9 and hence on the current measured by the device 15.

Figure 4:
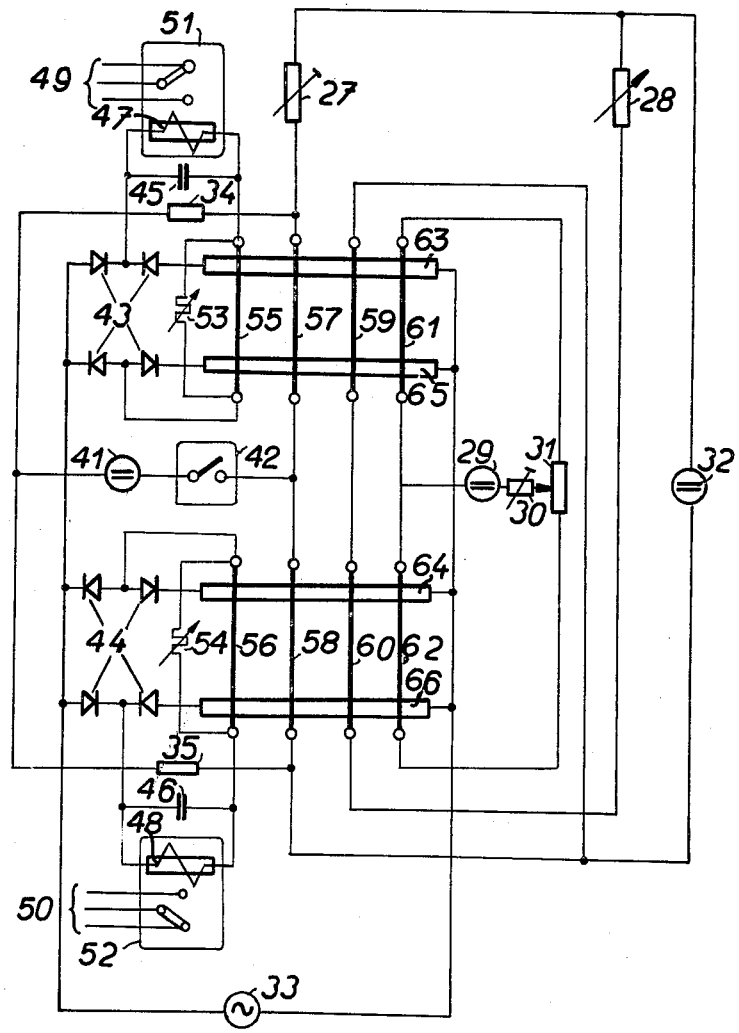
FIG. 4 is a circuit diagram of another embodiment of the invention.

The circuit of a three-step control device with impulse action according to the invention, for instance of a temperature control device with resistance detector, is shown in FIG. 4. The alternating-current source 33 supplies voltage to two separate working circuits of a symmetric magnetic amplifier. The first circuit consists of the working windings 63 and 65, of rectifying members 43, further of a feed-back winding 55 shunted by a resistor 53, and of a winding 47 of the output relay 51, which winding is shunted by a capacitor 45. The second working circuit includes the working windings 64 and 66, rectifying members 44, further a positive feed-back winding 56 which is shunted by a resistor 54, and a winding 48 of an output relay 52, which winding is shunted by a capacitor 46. The direct-current source 32 supplies voltage to the circuit for the adjustment of the desired temperature, which circuit includes an adjustable resistor 27, control windings 57 and 58, and also a circuit for measuring the controlled condition (temperature) which includes the resistance detector (thermometer) 28 and control windings 59 and 60. The direct-current source 29 supplies voltage to the circuit for the adjustment of the working characteristics (polarisation) of the two halves of the symmetric magnetic amplifier; this circuit consists of an adjustable resistor 30, a potentiometer 31, a control winding 61 and a control winding 62. The direct-current source 1 supplies voltage to the control windings 57 and 58 through the impulse circuit 42 (which may be the same as the impulse circuit 3 in FIG. 3) and through suitable resistors 34 and 35. The contacts of the relay 51 are connected to an output device 49, and the contacts of the relay 52 are connected to an output device 50.

The device according to the invention operates as follows:

The symmetric magnetic amplifier is adjusted (by means of the shunt 53 of the positive feed-back winding 55 and by means of the shunt 54 of the feed-back winding 56) in such a manner that it switches from an on condition to an off condition similarly to a multivibrator. The rate of change of the working currents of the amplifier is dependent on the magnitude of the signal, i.e. control ampere turns. On the other hand, the control circuits of the symmetric magnetic amplifiers are adjusted in such a manner that the control ampere turns are proportional to the deviation of the control condition from the adjusted value. If now periodically repeated electric impulses are supplied to certain of the control windings of the amplifier (for instance to the windings 57 and 58 or even to separate windings), the performance of the control device will be the same as that described with reference to FIG. 2, i.e. the time during which the one or the other relay will be switched-in within the individual impulse periods will depend on the magnitude and the sense of the deviation of the control condition (temperature) from the desired value.

The windings 57 and 58 in the circuit for the adjustment of the desired temperature and the windings 59 and 60 for the measurement of the controlled temperature are connected in opposition in such a manner that the difference between their ampere turns influences the symmetric magnetic amplifier. The required position of the working characteristics of the control device is adjusted by varying the initial voltage supplied from the source 29 by means of the resistor 30 and the potentiometer 31. Also the sensitivity of the control device may be adjusted by this initial voltage if required.

A two-step and three-step control device with impulse output according to the invention may be used not only in connection with a resistance temperature measuring device, but also in connection with a resistance detector of pressure position and the like. Moreover, these control devices may be operated with electric current which is supplied to the control windings (e.g. windings 57, 58 and 59, 60 in FIG. 4) directly or through suitable amplifiers known per se.

What we claim is:

1. Magnetic control apparatus, comprising a magnetic amplifier having working and control windings; a bridge rectifier circuit having said working windings connected in its branches, an alternating current source connected to the input terminals of the bridge rectifier circuit and an output relay connected between the direct current output terminals of the bridge rectifier circuit; a pulse generator for producing spaced periodic pulses and connected in series with one of said control windings for causing said magnetic amplifier to produce discrete output pulses; and means responsive to a given variable condition for controlling the duration of said output pulses in accordance with the magnitude of the variations of said condition, said means including a resistance bridge circuit having a device sensitive to said condition connected in series with one of said control windings in one arm of said bridge.

2. Apparatus according to claim 1, wherein said bridge circuit includes a constant resistor and a bifilar winding of said magnetic amplifier connected in series in the other arm of said bridge circuit.

3. Apparatus according to claim 1, including a source of direct current voltage connected across said bridge circuit and an additional control circuit connected in parallel with said bridge circuit, said additional control circuit including an adjustable resistor in series with a control winding of said magnetic amplifier wound in opposition to the control winding of said bridge circuit.

4. Apparatus according to claim 3, wherein said sensitive device is a temperature sensitive resistor, and said control device is a relay having its winding connected in series with a working winding of the magnetic amplifier.

5. Apparatus according to claim 4, including a meter connected across said bridge circuit, and means including a rectifier connecting the point between the control winding of the bridge circuit and the temperature sensitive resistor to said source of direct current voltage.

6. Apparatus according to claim 5, wherein said rectifier is connected in parallel with said meter.

7. Apparatus according to claim 5, wherein said rectifier is connected from said temperature sensitive resistor to said adjustable resistor.

8. Control apparatus according to claim 1, including a second magnetic amplifier having a working winding and a second relay and a second rectifier connected in series with said first source of current, said magnetic amplifiers having their corresponding control windings connected in series, means for connecting said pulse generator between two corresponding control windings of said amplifiers for supplying pulses thereto, said magnetic amplifiers including auxiliary control windings and means for applying an adjustable current bias to said auxiliary windings.

References Cited in the file of this patent

UNITED STATES PATENTS 2,284,423     Hansell _____ May 26, 1942

FOREIGN PATENTS 681,863     Great Britain _____ Oct. 29, 1952